W. Fosket,
Grinding Knives.
N° 51,779. Patented Dec. 26, 1865.

Witnesses: Inventor:

W. Fosket,
Grinding Knives.
No 51,779.    Patented Dec. 26, 1865.
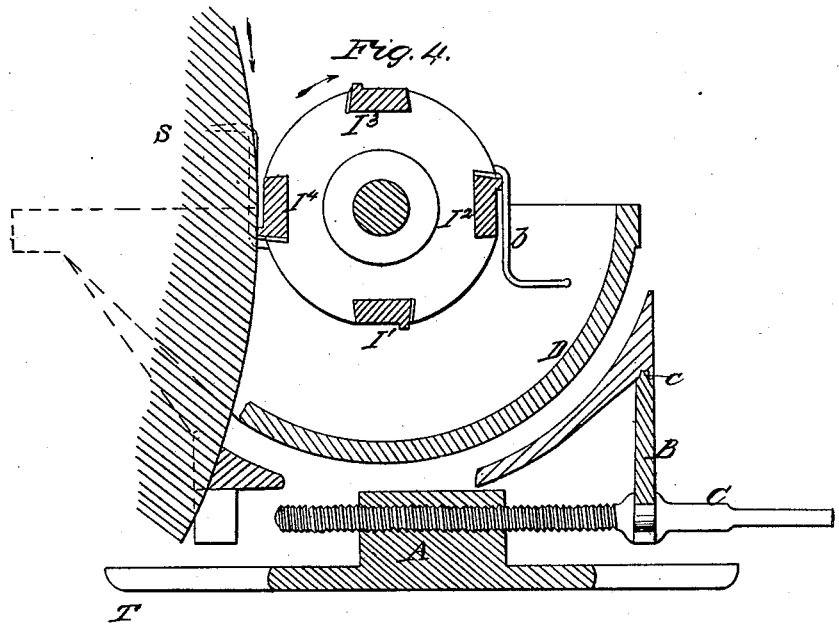
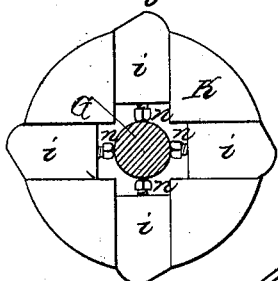
Witnesses:    Inventor:

UNITED STATES PATENT OFFICE.

WILLIAM FOSKET, OF MERIDEN, CONNECTICUT, ASSIGNOR TO THE MERIDEN CUTLERY COMPANY, OF SAME PLACE.

IMPROVEMENT IN MACHINERY FOR GRINDING KNIVES.

Specification forming part of Letters Patent No. 51,779, dated December 26, 1865.

*To all whom it may concern:*

Be it known that I, WM. FOSKET, of Meriden, in the county of New Haven and State of Connecticut, have invented a new and useful Improvement in Machines for Grinding and Polishing Cutlery, &c.; and I do hereby declare the following, when taken in connection with the accompanying drawings, and the letters of reference marked thereon, to be a full, clear, and exact description of the same, and which said drawings constitute part of this specification, and represent, in—

Figure 1:
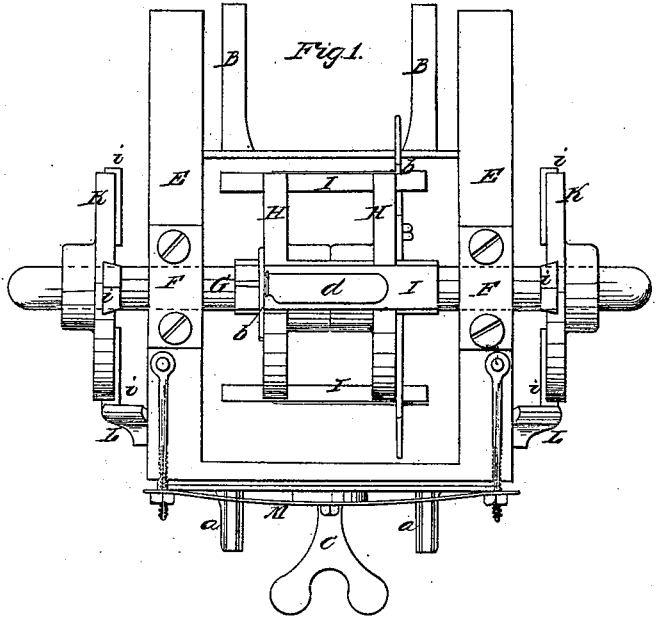
Figure 2:
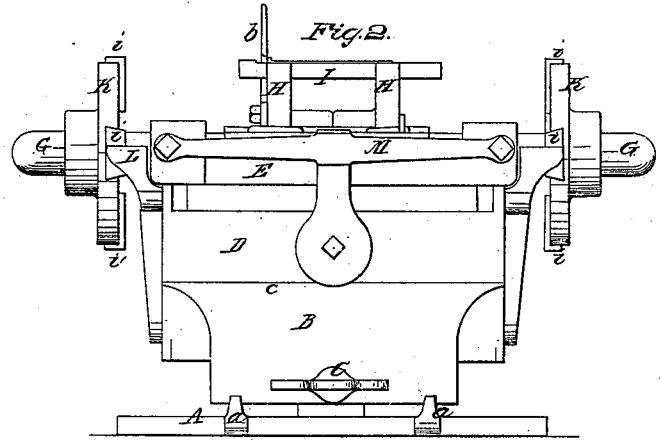
Figure 3:
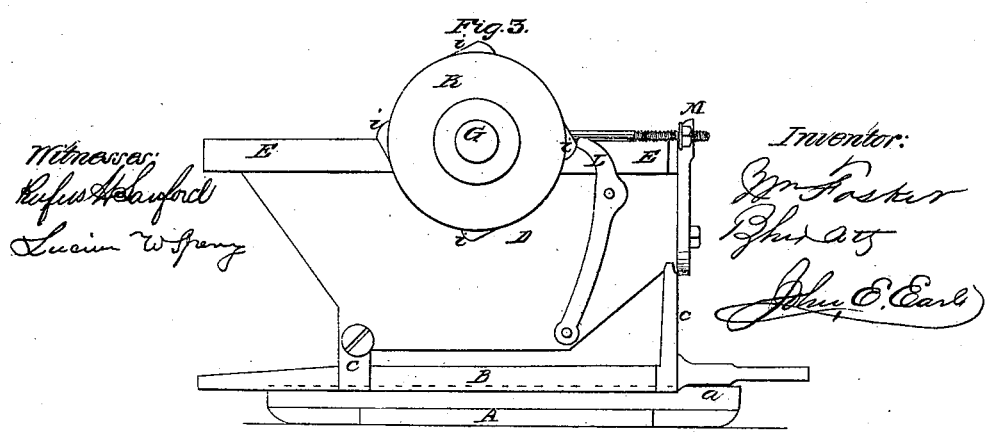

Figure 1, a plan or top view; Fig. 2, an end view; Fig. 3, a front side view; Fig. 4, a section cutting through line $x\,y$, and in Fig. 5 an inside view of one of the cam-wheels.

Similar letters and characters indicate corresponding parts in the several figures.

My invention relates to an improvement in machinery for grinding or finishing cutlery.

After the blades are formed by the process of forging, their surfaces require to be ground and finished. This is usually done by hand upon an ordinary grindstone and polishing-wheel; but the impossibility of finishing the surfaces alike in every blade makes an improvement which shall finish the blades alike and even desirable.

. To accomplish this is the object of my invention, which consists in the construction of a cylinder and cams in combination therewith, which shall guide the said cylinder so as to present the blade to the grindstone or polishing-wheel so as to give to the blade the required form.

To enable others skilled in the art to construct and use my invention, I will proceed to fully describe the same, as illustrated in the accompanying drawings.

A is the bed-plate, securely fixed upon the frame of the grindstone or polishing-wheel. B is a carriage riding upon ways $a$ on the said bed-plate, and is moved thereon by turning the screw C, for the purpose of moving the said carriage to or from the grindstone or polishing-wheel, as occasion may require. (See Fig. 4.) Upon the said carriage B is placed another carriage, D, which moves upon ways $c$ transversely across the bed-plate. A third carriage, E, rests upon the carriage D, so as to move freely thereon. On the said carriage E, in proper bearings F, rests a shaft, G, so as to revolve freely thereon. Upon the said shaft G are fixed two heads, H, of equal diameter, and upon the said heads I fix one or more matrices, I, formed to receive the blade $d$ to be ground. The said blade is held thereon by means of the clamp $b$ or other device. Upon the said shaft G, I fix cam-wheels K K, formed with projections $i$ therefrom, for the purpose of grinding and properly presenting the blade to the stone or wheel to be ground or polished.

L are bearings fixed to the carriage D, against which a projection, $i$, on the cam-wheels K bear to force the carriage E, with the cylinder and blade to be ground, to the stone or polishing-wheel at the proper time. The said projection $i$ must be of the proper form to present the blade to the stone or wheel in such manner as to give to the blade the form required. The lateral motion of the carriage E is allowed so as to bring the heel of each blade upon the edge of the wheel or stone, the blades being reversed upon alternate matrix I—that is, the heel of the blade is alternately placed at opposite ends of the matrix, so that upon one matrix one side of the blade will be ground or polished and upon the next the opposite side.

M is a spring fixed to the carriage D and attached to the carriage E, so as to force the said carriage back from the wheel, so that the cam-wheels K revolve against the bearings L. This completes the construction of my invention, the operation of which is as follows—see Fig. 4: S represents the stone, and T the frame which supports the stone and my machine, the stone and cylinder revolving in the direction denoted by arrows, the cylinder revolving by power applied to the shaft G, by hand or otherwise, to give it the required velocity. I represent the cylinder as constructed with four matrices.

Place a blade upon the matrix I′ and a second blade upon the matrix I³, and there secure by means of the clamp $b$ or other device. Then revolve the shaft G until the said matrix I′ presents the blade to the stone or wheel S, at which time a projection, $i$, on the cam-wheel K will strike the bearing L and force the carriage E toward the stone to properly present the surface of the blade to the stone or wheel S, the cylinder moving slowly until the blade is entirely beyond the action of the stone or wheel. The cylinder may be moved quickly over until the second blade is presented for a similar operation, during which operation the first blade is removed and placed in the next matrix, I², the other side up, and that blade which was placed in the matrix I³ will in like manner be placed in the matrix I⁴, reversing the blade and unground blades placed in the matrix I' and I³, as before. Thus both sides of the blades are formed with that precision guaranteed by the form of the projections $i$ on the cam-wheels, and any blade so formed or finished will be of the same form of surface.

If power be applied to revolve the shaft G, it should be so applied as to revolve quickly between the matrix and slowly while the matrix is passing the stone or wheel.

If the stone be narrower than the distance from the bolster of the blade on one matrix to the bolster of the blade on the next matrix, a lateral movement given to the carriage D will carry the frame E, and with it the shaft and cylinder, so that the bolster may be presented to the edge of the stone or wheel and ground or polished as required.

As the stone or wheel is worn away by constant use, the carriage B should be moved toward the stone accordingly by means of the screw C; or, if desired for any purpose to remove the machine from the stone or wheel, it may be done by means of the said screw C.

The matrix in which the blade is placed will be varied according to the form of the blade to be ground; or, if other articles are to be ground, the matrix must be formed accordingly; but in any case the matrix should be securely and firmly fixed to the cylinder. The projections upon the cam-wheels must also be formed so as to present the surface to be ground in the proper manner. I make the projection $i$ on the cam-wheel adjustable (see Fig. 5) by means of screw $n$, which being turned forces the projection out or in, as the case may be.

I describe a cylinder upon which the matrix are placed as arranged with four matrices, yet more or less may be use; but four I find to be the most convenient arrangement. The carriage F may be moved by the action of the cam-wheels, so that any peculiar form required for the surface to be ground, be it flat, convex, or concave, or other form, may be readily given it.

I have described my invention as for grinding cutlery, yet I do not confine myself to any one purpose, as many articles of manufacture may be finished thereon in similar manner.

When the metals to be formed or finished are tempered, as cutlery, &c., the forming or finishing must be done by grinding; but for such articles as may be finished while the metal is soft or untempered cutters or similar device may be used in place of the grinding apparatus.

I do not broadly claim forming, grinding, or polishing the surface of articles by securing them to a cylinder revolving against and in the same direction as the grindstone or polishing-wheel which forms, grinds, or polishes the surface, as such is not new; but,

Having thus fully described my invention, what I do claim as new and useful, and desire to secure by Letters Patent, is—

A cylinder arranged with fixed matrix or matrices revolving in the manner substantially as described, in combination with the bearings L, cam-wheels K, and the projections thereon, constructed and arranged to operate substantially in the manner and for the purpose described.

WM. FOSKET.

Witnesses:
  JOHN E. EARLE,
  RUFUS H. SANFORD.